United States Patent
Walters et al.

(10) Patent No.: US 6,693,586 B1
(45) Date of Patent: Feb. 17, 2004

(54) NAVIGATION APPARATUS FOR COUPLING WITH AN EXPANSION SLOT OF A PORTABLE, HANDHELD COMPUTING DEVICE

(75) Inventors: Thomas H. Walters, Gardner, KS (US); Michael R. Wiegers, Overland Park, KS (US); Robert M. Kalis, Overland Park, KS (US)

(73) Assignee: Garmin Ltd. (KY)

( * ) Notice: Subject to any disclaimer, the term of this patent is extended or adjusted under 35 U.S.C. 154(b) by 0 days.

(21) Appl. No.: 10/215,891

(22) Filed: Aug. 10, 2002

(51) Int. Cl.[7] ............................. G01S 5/02; H04B 7/185
(52) U.S. Cl. ............................. 342/357.13; 342/357.1; 342/357.06; 701/213
(58) Field of Search .................. 342/357.06, 357.1, 342/357.13; 701/213

(56) References Cited

U.S. PATENT DOCUMENTS

| | | | |
|---|---|---|---|
| 5,938,721 A | 8/1999 | Dussell et al. | 701/211 |
| 6,177,905 B1 | 1/2001 | Welch | 342/357.13 |
| 6,266,612 B1 | 7/2001 | Dussell et al. | 701/207 |
| 6,321,158 B1 | 11/2001 | DeLorme et al. | 701/201 |
| 6,411,899 B2 | 6/2002 | Dussell et al. | 701/211 |
| 6,456,938 B1 * | 9/2002 | Barnard | 701/213 |
| 6,525,932 B1 * | 2/2003 | Ohnishi et al. | 361/686 |
| 6,573,868 B2 * | 6/2003 | Johnson et al. | 343/702 |
| 6,599,147 B1 * | 7/2003 | Mills et al. | 439/377 |

* cited by examiner

Primary Examiner—Theodore M. Blum
(74) Attorney, Agent, or Firm—Devon A. Rolf

(57) ABSTRACT

A navigation apparatus (10) configured for removably coupling with and providing navigational capabilities to a portable, handheld computing device (12). The navigation apparatus (10) includes a navigation receiver (26) for receiving navigation signals from a plurality of sources; a processor (24) coupled with the navigation receiver (26) for determining a location of the navigation apparatus (10) as a function of the received navigation signals; and an interface/connector (44). The interface/connector (44) is either a Secure Digital slot connector or a Compact Flash slot connector. Location data stored in the navigation apparatus (10) and data representative of the location determined by the navigation apparatus (10) may be delivered from the processor (24) to the handheld computing device (12) so that it may be displayed and used by a user of the device (12).

37 Claims, 3 Drawing Sheets

NAVIGATION APPARATUS FOR COUPLING WITH AN EXPANSION SLOT OF A PORTABLE, HANDHELD COMPUTING DEVICE

BACKGROUND OF THE INVENTION

1. Field of the Invention

The present invention relates to navigation devices. More particularly, the invention relates to a navigation apparatus configured for removably coupling with and providing navigational capabilities to a portable, handheld computing device such as a personal digital assistant or pocket PC.

2. Description of the Prior Art

Global positioning system (GPS) receivers and other navigational devices continue to grow in popularity and are used in many applications, including recreational activities and automobile and marine navigation. The global positioning system (GPS) is an electronic satellite navigation system which permits users to determine their position with respect to the Earth. Global positioning may be determined with a handheld GPS receiver which detects and decodes signals from a number of satellites orbiting the Earth. The signals from each of these satellites indicate the position of the satellite and the time at which the signals were sent. To decode the satellite signals, known as spread spectrum signals, and thereby calculate desired position and navigational data, a GPS receiver must first "find" or acquire the signals emitted from a minimum number of satellites. Once the receiver is "locked on" to the spread spectrum signals, the user's global position and other navigational data (e.g., velocity of movement) can be calculated.

A typical GPS unit includes (along with other components) a GPS receiver which receives satellite signals from a plurality of GPS satellites, resident memory in which cartographic data and other location information may be stored, a processor for determining the location of the unit as a function of the received satellite signals and for accessing and processing data and information in the memory, and a display for displaying the information along with an indication of the unit's location. The resident memory may be integral with the processor, memory chips coupled with the processor, or may include plug-in memory modules that fit within corresponding memory slots in the receiver. The processor retrieves information from the memory, for example, to display maps and routing instructions to permit a user of the GPS receiver to navigate to a desired location.

Portable, handheld computing devices such as personal digital assistants (PDAs) and pocket PCs also continue to grow in popularity. Such devices are compact and lightweight and therefore can be easily carried to allow users to quickly and easily retrieve and store phone numbers, schedules, notes, and other data, play computer games, and/or perform many other computing functions previously reserved for larger desktop or laptop computers.

With the continued popularity of both GPS devices and portable, handheld computing devices, combined portable GPS/computer units which perform many of the same functions as separate GPS units and handheld computing devices have been developed. Unfortunately, such combined units are typically larger and heavier than handheld computing devices alone and therefore defeat some of the portability advantages of these devices. Moreover, many people already own conventional handheld computing devices and do not wish to discard them for newer combined GPS/computer units.

To alleviate some of the limitations of combined GPS/computer units, peripheral GPS devices have been developed that plug in or otherwise connect with conventional handheld computing devices. These peripheral GPS devices can be used to provide some navigational capabilities to existing handheld computing devices and can be removed when not needed so as not to distract from the portable nature of the devices.

Unfortunately, known peripheral GPS devices also suffer from several limitations that limit their utility. For example, such devices are configured for coupling with a serial port of a handheld computing device. Most handheld computing devices have only one serial port, and once it is used to couple with a peripheral GPS device, it is no longer available for other purposes such as downloading information from a personal computer. Moreover, known peripheral GPS devices have limited processing power and little or no memory and therefore are unable to provide many enhanced navigational capabilities desired by users.

SUMMARY OF THE INVENTION

The present invention solves the above-described problems and provides a distinct advance in the art of portable navigation devices. More particularly, the present invention provides a navigation apparatus configured for removably coupling with and providing navigational capabilities to a portable, handheld computing device such as a PDA or pocket PC without obstructing use of the handheld computing device's serial port. Moreover, the navigation apparatus of the present invention provides greater processing power and additional memory capabilities and options to provide more enhanced navigational capabilities to the handheld computing device.

One embodiment of the navigation apparatus of the present invention broadly includes a navigation receiver for receiving navigation signals from a plurality of sources; a processor coupled with the navigation receiver for determining a location of the navigation apparatus as a function of the received navigation signals; memory accessible by the processor for storing location data; and a connector coupled with the processor. The connector is preferably either a Secure Digital slot connector or a Compact Flash slot connector for removably connecting with a corresponding Secure Digital or Compact Flash expansion slot on the handheld computing device. When the navigation apparatus is connected with the handheld computing device, location data stored in the memory of the navigation apparatus and data representative of the location determined by the navigation apparatus may be delivered from the processor of the navigation apparatus to the handheld computing device so that it may be displayed and used by a user of the device.

Certain cartographic data and other useful location information may be pre-loaded in the memory of the navigation apparatus so that it can be later used by the handheld computing device as described above. For example, if a user plans to use the navigation apparatus in the Kansas City, Missouri area, cartographic data and other useful information relevant to the Kansas City area may be pre-loaded into the memory. Additional cartographic data and other useful location information that is not pre-loaded into the navigation apparatus maybe loaded via several methods.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein.

Figure 4:
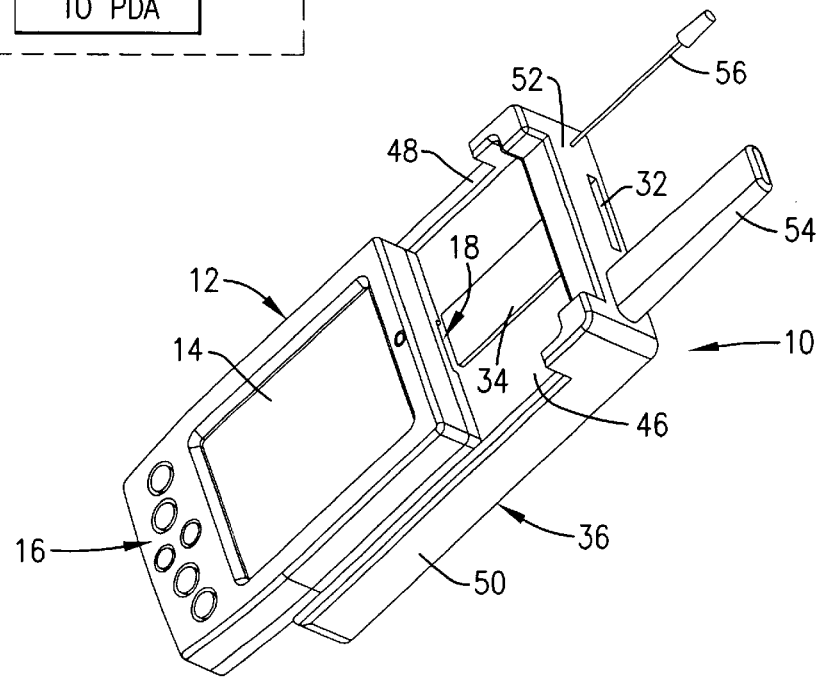

FIG. 4, in an isometric view of a navigation apparatus constructed in accordance with another embodiment of the present invention and shown connected to a portable, handheld computing device.

Figure 5:
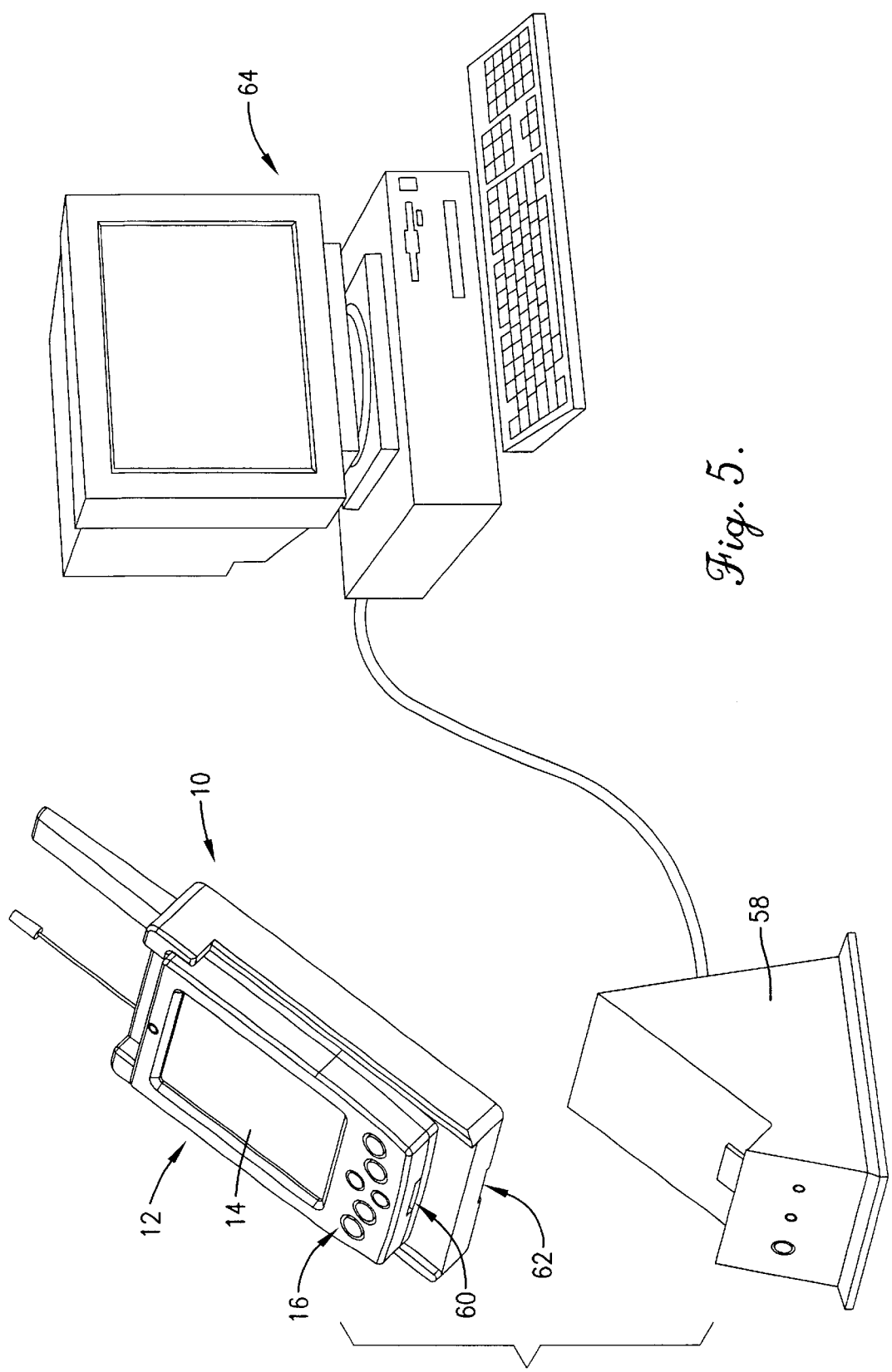

FIG. 5, is an isometric view of the navigation apparatus and handheld computing device of FIG. 4 shown with a personal computer and docking station.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Figure 1:
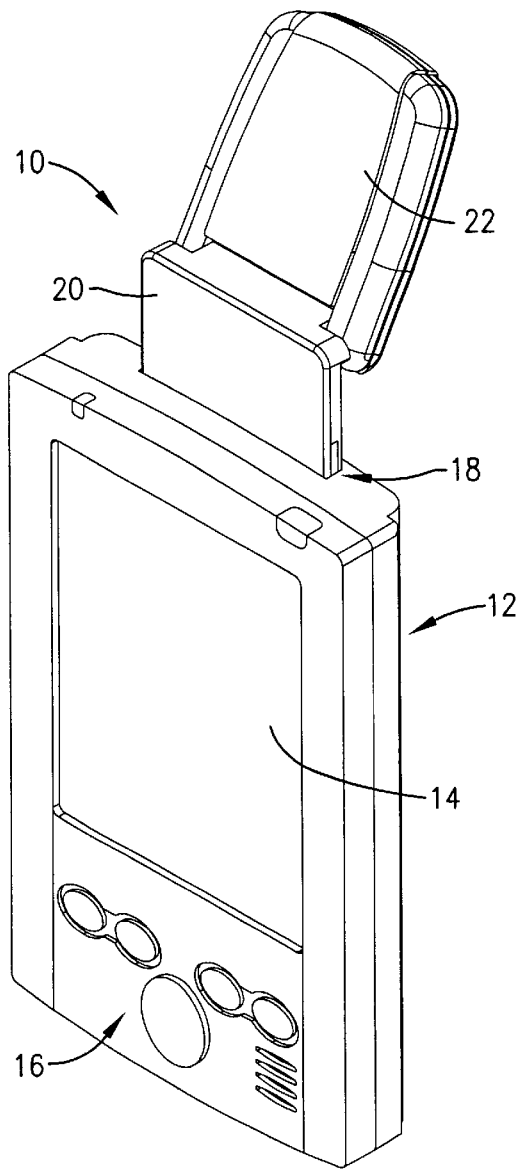
FIG. 1 is an isometric view of a navigation apparatus constructed in accordance with a preferred embodiment of the present invention and shown partially inserted into a portable, handheld computing device.

Turning now to the drawing figures, and particularly FIG. 1, a navigation apparatus 10 constructed in accordance with a preferred embodiment of the present invention is illustrated. The navigation apparatus 10 is configured to be removably coupled with a portable, handheld computing device 12 and to provide navigational capabilities to the device.

The handheld computing device 12 may be any portable, handheld computer such as a personal digital assistant (PDA), pocket PC or a cellular phone-enabled PDA. The illustrated handheld computing device 12 is entirely conventional and includes, among other components, a display screen 14, a plurality of control buttons 16 for operating certain functions of the device, and an expansion slot or interface 18. The expansion slot may be either a Secure Digital interface or a Compact Flash interface. The device 12 preferably uses the Pocket PC or Windows CE operating system but may use other conventional operating systems.

Figure 2:
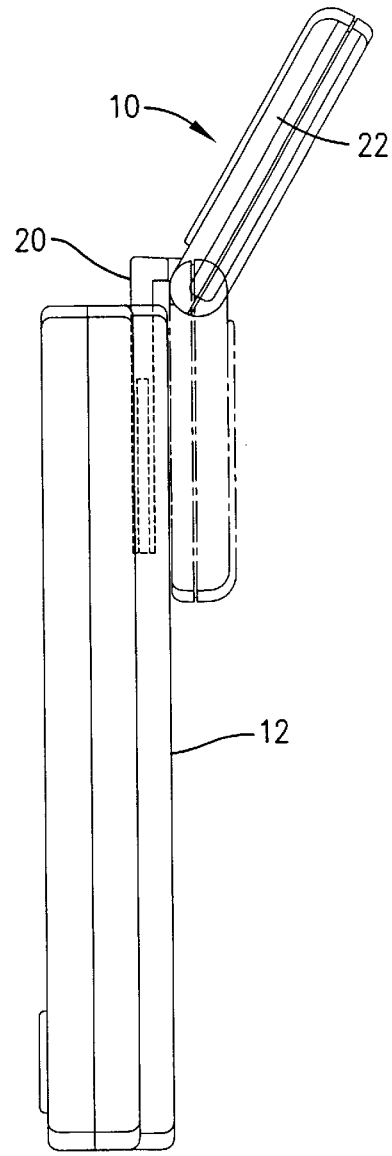
FIG. 2 is a side view of the navigation apparatus and handheld computing device of FIG. 1 showing the navigation apparatus in its extended or raised position by solid lines and in its folded or retracted position by dashed lines.

Referring initially to FIGS. 1 and 2, a preferred embodiment of the navigation apparatus 10 includes a clam-shell type housing having two sections: a lower section 20 configured to plug into the expansion slot or interface 18 on the handheld computing device 12; and an upper section 22 hingedly connected to the lower section 20. The upper section 22 may be positioned in either an extended or raised position as illustrated in FIG. 1 and by the solid lines in FIG. 2 or a folded or lowered position as illustrated by the dashed lines in FIG. 2. A pair of antennas are positioned in the upper section 22 so that they may be raised or lowered relative to the lower section 20 as described in more detail below.

Figure 3:
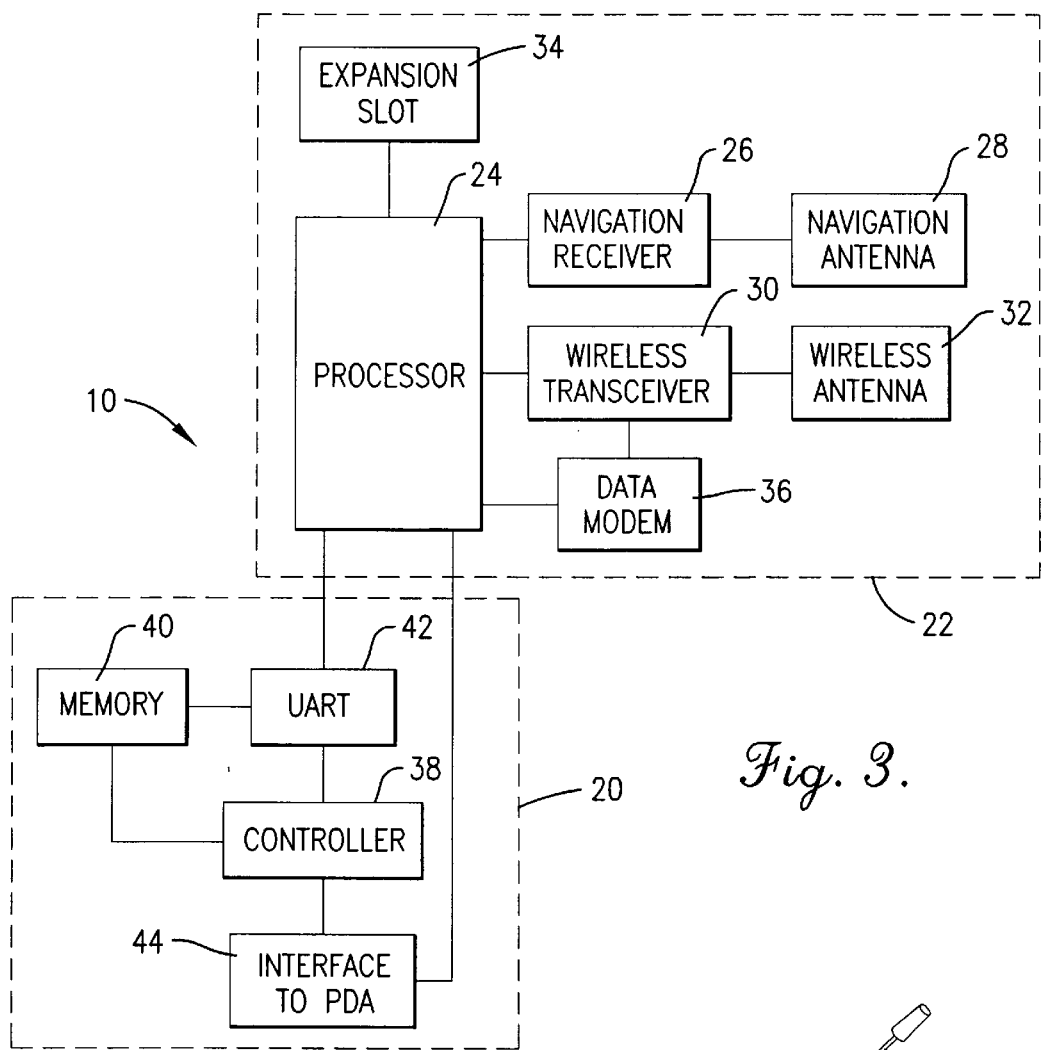
FIG. 3 is a block diagram of certain components of the navigation apparatus.

Referring to FIG. 3, the upper section 22 houses a processor 24, a navigation receiver 26, and a navigation antenna 28. The upper section 22 may also house a wireless transceiver 30, a wireless antenna 32, and a memory expansion slot 34. The lower section 20 houses a controller 38, memory 40, a universal asynchronous receiver/transmitter (UART) 42, and an interface/connector 44 for connecting with the expansion slot or interface 18 on the handheld computing device 12. The lower section 20 and upper section 22 are connected by a minimum of five electrical connections: VCC, ground, serial TX, serial RX, and processor reset. These connections can be made by a flexible cable, wiring harness, or soldered wires.

The processor 24 is preferably a Bravo 1.1 processor with an ARM 7 core and a PECL-level GPS correlator. The preferred Bravo 1.1 processor includes 256 k of internal RAM; therefore, no external memory is required, saving cost and board space. However, additional external memory may be coupled with the processor 24.

The navigation receiver 26 is preferably a GPS receiver configured for receiving satellite signals from a plurality of GPS satellites. The GPS receiver 26 is coupled with the processor 24 so that the processor 24 may determine the current location of the navigation apparatus 10 as a function of the received satellite signals.

The antenna 28 is preferably a patch antenna embedded in the housing of the upper section 22 and is coupled with the navigation receiver 26. The upper section 22 and its integral antenna 28 may be tilted relative to the handheld computing device 12 as depicted in FIGS. 1 and 2 to provide optimum positioning of the antenna 28 relative to GPS satellites in the sky. When the navigation apparatus 10 is not in use, the upper section 22 and the antenna 28 may be folded behind the handheld computing device 12 as illustrated by the dashed lines in FIG. 1 so as not to obstruct normal use of the handheld computing device 12.

Although not preferred, the upper section 22 and lower section 20 maybe split into two distinct portions and connected by a cable to permit remote mounting of the upper section 22 on a car windshield or elsewhere. The navigation apparatus 10 may also be equipped with an MCX connector for attaching to an external GPS antenna.

The wireless transceiver 30 is coupled with the processor 24 and is configured for receiving and transmitting data such as cartographic map data as described in more detail below. The wireless transceiver 30 may be a cellular radio transceiver configured for transmitting and receiving data via a wireless radio network, an infrared transceiver configured for transmitting and receiving data via an infrared communications link, or a transceiver configured for communicating by other conventional means such as in the unlicenced 2.4 Ghz or other radio spectrum using Bluetooth or Wifi wireless specifications. The wireless transceiver 30 may also be coupled with a data modem 36 for use in modulating and demodulating transmitted and received data.

The wireless antenna 32 may be any conventional radio antenna such as a cellular radio antenna. The wireless antenna 32 is embedded in the housing of the upper section 22 and is coupled with the wireless transceiver 30. As with the navigation antenna 28, the wireless antenna 32 may be tilted relative to the handheld computing device 12 as depicted in FIGS. 1 and 2 to provide optimum positioning of the antenna. When the navigation apparatus 10 is not in use, the upper section 22 and the embedded wireless antenna 32 may be folded behind the handheld computing device 12 as illustrated by the dashed lines in FIG. 1 so as not to obstruct normal use of the handheld computing device 12.

The expansion slot 34 is coupled with the processor 24 and is configured for receiving plug-in memory modules. The expansion slot 34 is preferably a Compact Flash or Secure Digital expansion slot, but may be any other conventional expansion slot or connector. The expansion slot 34 is preferably formed at the top of the upper section 22 but may be formed elsewhere on the navigation apparatus 10 as a matter of design choice.

The controller 38 serves as an interface between the processor 24 and the interface/connector 44. The controller 38 is preferably an ASIC programmed to communicate with the processor 24.

The UART 42 is coupled with the controller 38 to provide serial communication between the controller 38 and the processor 24 using the controller's external flash memory bus. Instead of a separate controller and UART, the navigation apparatus 10 may include a controller with a built-in UART.

The memory 40 is coupled with or accessible by the controller 38 and is configured for storing location data and information such as cartographic data (i.e., electronic maps) that may be accessed by the controller. The memory 40 is preferably 65 Mbytes of NAND flash memory and may consist of on-board memory embedded in or accessible by the controller or plug-in memory modules which may be plugged into the expansion slot 34.

The interface/connector 44 is coupled with the controller 38 and mounted on the lower section 20 of the housing in such a way so as to be removably connectable to the expansion slot 18 on the handheld computing device 12. The interface/connector 44 is preferably a Compact Flash or Secure Digital slot connector. When the navigation apparatus 10 is connected to the handheld computing device 12 via the interface/connector 44, the processor 24 and the controller 38 provide navigational capabilities to the handheld computing device 12 as described in more detail below. Power is supplied to the navigation apparatus 10 from the power supply (e.g. batteries) of the handheld computing device via the interface/connector 44.

The navigation apparatus 10 may also include one or more inputs (not shown) such as an alphanumeric keypad and/or control buttons for use in entering information or operating drop-down menus. Other input devices such as a microphone/voice recognition input or a touchscreen may also be provided. Alternatively, operation of the navigation apparatus 10 may be controlled by the control buttons 16 on the handheld computing device 12.

A second embodiment of the navigation apparatus is illustrated in FIGS. 4 and 5 and has a housing in the form of a sled rather than a clam-shell. The sled-type housing is preferably generally rectangular in shape as illustrated and includes a back wall 46, upstanding sidewalls 48, 50 and an upstanding top wall 52 with raised edges that together define a track for receiving and supporting the handheld computing device 12. A navigation antenna 54 and wireless antenna 56 similar to those described above extend upwardly from the housing top wall 52, as illustrated.

In operation, the handheld computing device 12 may be used in a conventional manner whenever it is not coupled with the navigation apparatus 10. When it is desired to provide navigational capabilities to the handheld computing device 12, the navigation apparatus 10 may be inserted into the expansion slot 18 of the handheld computing device 12. This couples the processor 24 and controller 38 of the navigation apparatus 10 with the control system in the handheld computing device 12 so that the handheld computing device 12 may receive data and instructions from the navigation apparatus 10.

In one application, the navigation apparatus 10 calculates its current location with the GPS receiver 26 and processor 24 in a conventional manner. The processor 24 then generates data representative of the current location and transmits it to the handheld computing device 12 via the controller 38 and interface/connector 44 on the navigation apparatus 10 and the expansion slot 18 on the handheld computing device 12. The handheld computing device 12 may then display information representative of the current location of the navigation apparatus 10. Cartographic map data, routing instructions, waypoint data, and other useful information may be delivered to the handheld computing device 12 from the navigation apparatus 10 in a similar fashion.

The navigation apparatus may also include a microphone and speaker and be programmed to respond to voice commands and to provide synthesized voice routing instructions. Such functionality may be provided by the navigation apparatus alone, by a combination of the navigation apparatus and the handheld computing device, or by the handheld computing device alone.

Applicant contemplates that certain cartographic data and other location information may be pre-loaded in the memory 40 so that it can be later used by the handheld computing device 12 as described above. For example, if a user plans to use the navigation apparatus 10 in the Kansas City, Mo. area, cartographic data and other useful information relevant to the Kansas City area may be pre-loaded into the memory 40.

Additional cartographic data and other location information that was not pre-loaded into the navigation apparatus 10 may be loaded via several methods. In one method, the handheld computing device 12 is first connected with the navigation apparatus 10, as illustrated in FIG. 4, then the handheld computing device 12 is connected to a docking station 58 via a serial port 60 on the handheld computing device 12 as illustrated in FIG. 5. The docking station 58 is in turn connected to a serial port 62 on a personal computer 64 or other computing device. Information is then downloaded from the personal computer 64 to the docking station 58, from the docking station 58 to the handheld computing device 12, and then from the handheld computing device 12 to the memory 40 of the navigation apparatus 10.

In another method, the navigation apparatus 10 has its own serial port 62, as illustrated in FIG. 5, and this serial port 62 is used to connect the navigation apparatus 10 with the docking station 58. Cartographic data and other useful information may then be downloaded directly from the personal computer 64 to the navigation apparatus 10.

In another method, the navigation apparatus 10 may be inserted into a compact card programmer module (not shown) which attaches to the personal computer 62 so that cartographic data and other information may be loaded directly into the navigation apparatus 10.

In another method, the wireless transceiver 30, data modem 36, and wireless antenna 32 of the navigation apparatus 10 are used to wirelessly receive data from the personal computer 64 or other computing device. As mentioned above, the data may be transmitted by various wireless communication methods, including cellular radio, infrared, Bluetooth, or Wifi. Alternatively, if the wireless transceiver 30 is a cellular radio transceiver, data may be downloaded from a remote server via a wireless telecommunications network.

In another embodiment, memory modules having cartographic data and other useful information stored thereon may be plugged into the expansion slot 34 of the navigation apparatus 10.

Although the invention has been described with reference to the preferred embodiment illustrated in the attached drawing figures, it is noted that equivalents may be employed and substitutions made herein without departing from the scope of the invention as recited in the claims. For example, the particular shape and size of the navigation apparatus 10 may be varied as a matter of design choice.

Moreover, although the navigation apparatus 10 of the present invention is preferably configured for removably coupling with a handheld computing device 12, it may be used to provide navigational capabilities to any similar apparatus.

Having thus described the preferred embodiment of the invention, what is claimed as new and desired to be protected by letters patent includes the following:

1. A navigation apparatus configured for coupling with and providing navigational capabilities to a portable, handheld computing device, the navigation apparatus comprising:
   a navigation receiver for receiving navigation signals from a plurality of sources;
   a processor coupled with the navigation receiver for determining a location of the navigation apparatus as a function of the received navigation signals;
   memory accessible by the processor for storing location data; and
   a connector coupled with the processor and selected from the group consisting of a Secure Digital slot connector and a Compact Flash slot connector for removably connecting with a corresponding expansion slot on the handheld computing device so that the location data stored in the memory and data representative of the location of the apparatus may be delivered from the processor of the navigation apparatus to the handheld computing device.

2. The navigation apparatus as set forth in claim 1, wherein the location data includes cartographic map data used for displaying cartographic maps on a display of the handheld computing device.

3. The navigation apparatus as set forth in claim 1, wherein the memory is resident in the navigation apparatus.

4. The navigation apparatus as set forth in claim 1, further including a wireless transceiver for transmitting and receiving data over a wireless communications network.

5. The navigation apparatus as set forth in claim 4, wherein the wireless transceiver is a cellular transceiver and the wireless communications network is a cellular radio network.

6. The navigation apparatus as set forth in claim 1, further including a portable, handheld housing for housing the navigation receiver, the processor, the memory, and the connector.

7. The navigation apparatus as set forth in claim 6, the handheld housing including a lower section housing the connector and an upper section hingedly connected to the lower section and moveable between raised and lowered positions relative to the lower section.

8. The navigation apparatus as set forth in claim 7, further including a navigation antenna coupled with the navigation receiver and positioned in the upper section of the housing so that the navigation antenna may be raised and lowered with the upper section.

9. The navigation apparatus as set forth in claim 7, further including a wireless antenna coupled with the navigation receiver and positioned in the upper section of the housing so that the wireless antenna may be raised and lowered with the upper section.

10. The navigation apparatus as set forth in claim 6, further including an expansion slot positioned on the housing and selected from the group consisting of a Secure Digital slot and a Compact Flash slot for removably coupling with an external memory cartridge that, when received in the expansion slot, can be accessed by the processor.

11. The navigation apparatus as set forth in claim 1, wherein the handheld computing device is a personal digital assistant.

12. A navigation apparatus configured for coupling with and providing navigational capabilities to a portable, handheld computing device, the navigation apparatus comprising:
   a navigation receiver for receiving navigation signals from a plurality of sources;
   a processor coupled with the navigation receiver for determining a location of the navigation apparatus as a function of the received navigation signals, wherein the processor provides additional processing capacity beyond the handheld computing device such that the processor may compute separately from the handheld computing device;
   an expansion slot coupled with the processor and selected from the group consisting of a Secure Digital slot and a Compact Flash slot for removably coupling with an external memory cartridge which has location data stored thereon, wherein the processor may access the location data from the external memory cartridge via the expansion slot; and
   a connector coupled with the processor and selected from the group consisting of a Secure Digital slot connector and a Compact Flash slot connector for connecting with a corresponding expansion slot on the handheld computing device so that the location data stored in the memory and data representative of the location of the apparatus may be delivered from the processor of the navigation apparatus to the handheld computing device.

13. The navigation apparatus as set forth in claim 12, wherein the location data includes cartographic map data used for displaying cartographic maps on a display of the handheld computing device.

14. The navigation apparatus as set forth in claim 12, further including memory resident in the navigation apparatus.

15. The navigation apparatus as set forth in claim 12, further including a wireless transceiver for transmitting and receiving data over a wireless communications network.

16. The navigation apparatus as set forth in claim 15, wherein the wireless transceiver is a cellular transceiver and the wireless communications network is a cellular radio network.

17. The navigation apparatus as set forth in claim 12, further including a portable, handheld housing for housing the navigation receiver, the processor, the memory, and the connector.

18. The navigation apparatus as set forth in claim 12, wherein the portable, handheld computing device is a digital assistant.

19. A method of storing location data in a navigation apparatus configured for coupling with a handheld computing device, the method comprising the steps of:
   connecting the navigation apparatus to the handheld computing device via a connector selected from the group consisting of a Compact Flash connector and a Secure Digital connector;
   connecting the handheld computing device to a computer;
   transferring the location data from the computer to the handheld computing device;
   transferring the location data from the handheld computing device to the navigation apparatus; and
   storing the location data in memory resident in the navigation apparatus such that the navigation apparatus may access the memory.

20. The method as set forth in claim 19, further including the step of storing the location data in memory cartridges removably coupled with an expansion slot on the navigation apparatus.

21. The method as set forth in claim 19, wherein the handheld computing device is a personal digital assistant.

22. The method as set forth in claim 19, wherein the location data includes cartographic map data that may be used to display cartographic maps on a display of the handheld computing device.

23. A method of storing location data in a navigation apparatus configured for coupling with a portable, handheld computing device, the method comprising the steps of:
connecting the navigation apparatus to the handheld computing device via a connector selected from the group consisting of a Compact Flash connector and a Secure Digital connector;
establishing a wireless communications connection between the handheld computing device and a computer;
transferring the location data from the computer to the handheld computing device via the wireless communications connection;
transferring the location data from the handheld computing device to the navigation apparatus; and
storing the location data in memory resident in the navigation apparatus such that the navigation apparatus may access the memory.

24. The method as set forth in claims 23, further including the step of storing the location data in memory cartridges removably coupled with a expansion slot on the navigation apparatus.

25. The method as set forth in claim 23, wherein the handheld computing device is a personal digital assistant.

26. The method as set forth in claim 23, wherein the location data includes cartographic map data that may be used to display cartographic maps on a display of the handheld computing device.

27. The method as set forth in claim 23, wherein the wireless communications connection is selected from the group consisting of a Bluetooth wireless connection, a Wifi wireless connection, a wireless LAN connection, an infrared wireless connection and a cellular radio wireless connection.

28. A navigation apparatus configured for coupling with and providing navigational capabilities to a portable, handheld computing device, the navigation apparatus comprising:
a navigation antenna for detecting navigation signals from a plurality of sources;
a navigation receiver coupled with the navigation antenna for receiving the navigation signals therefrom;
a processor coupled with the navigation receiver for determining a location of the navigation apparatus as a function of the received navigation signals, wherein the processor provides additional processing capacity beyond the handheld computing device such that the processor may compute separately from the handheld computing device;
memory accessible by the processor for storing location data, wherein the memory is resident in the navigation apparatus and provides additional memory beyond the handheld computing device;
a connector coupled with the processor for removably connecting with a corresponding expansion slot on the handheld computing device so that the location data stored in the memory and data representative of the location of the apparatus may be delivered from the processor of the navigation apparatus to the handheld computing device, wherein the connector is selected from the group consisting of a Secure Digital slot connector and a Compact Flash slot connector; and
a portable housing including
a lower section for housing the connector, and
an upper section hingedly connected with the lower section for housing the navigation antenna, the upper section and the navigation antenna being moveable between raised and lowered positions relative to the lower section.

29. The navigation apparatus as set forth in claim 28, wherein the upper section further houses the navigation receiver and the processor.

30. The navigation apparatus as set forth in claim 28, further including a wireless transceiver positioned in the upper section for transmitting and receiving data over a wireless communications network.

31. The navigation apparatus as set forth in claim 30, wherein the wireless transceiver is a cellular transceiver and the wireless communications network is a cellular radio network.

32. The navigation apparatus as set forth in claim 31, further including a wireless antenna coupled with the wireless transceiver and positioned in the upper section so that the wireless antenna may be moved between raised and lowered positions.

33. A navigation apparatus configured for coupling with and providing navigational capabilities to a portable, handheld computing device, the navigation apparatus comprising:
a navigation receiver for receiving navigation signals from a plurality of sources;
a processor coupled with the navigation receiver for determining a location of the navigation apparatus as a function of the received navigation signals and creating data representative of the location;
memory accessible by the processor for storing cartographic data; and
a connector coupled with the processor and selected from the group consisting of a Secure Digital slot connector and a Compact Flash slot connector for removably connecting with a corresponding expansion slot on the handheld computing device so that the cartographic data stored in the memory and the data representative of the location of the apparatus may be delivered from the processor of the navigation apparatus to the handheld computing device.

34. The navigation apparatus as set forth in claim 33, further including a wireless transceiver for transmitting and receiving data over a wireless communications network.

35. The navigation apparatus as set forth in claim 34, wherein the wireless transceiver is a cellular transceiver and the wireless communications network is a cellular radio network.

36. The navigation apparatus as set forth in claim 33, further including a portable, handheld housing for housing the navigation receiver, the processor, the memory, and the connector.

37. The navigation apparatus as set forth in claim 33, wherein the portable, handheld computing device is a digital assistant.

* * * * *